United States Patent
Echarri Latasa et al.

(10) Patent No.: US 8,550,522 B2
(45) Date of Patent: Oct. 8, 2013

(54) TOOL FOR RAISING AND LOWERING A WIND TURBINE BLADE

(75) Inventors: Román Echarri Latasa, Navarra (ES); Sayoa Clavería Ibarrola, Navarra (ES); Eduardo Arraiza Arbeloa, Navarra (ES); Javier Fernández De Manzanos Domínguez, Navarra (ES); JoséMiguel García Sayés, Navarra (ES); Miguel Núñez Polo, Navarra (ES)

(73) Assignee: Acciona Windpower, S.A. (ES)

( * ) Notice: Subject to any disclaimer, the term of this patent is extended or adjusted under 35 U.S.C. 154(b) by 102 days.

(21) Appl. No.: 13/191,593

(22) Filed: Jul. 27, 2011

(65) Prior Publication Data
US 2012/0025552 A1    Feb. 2, 2012

(30) Foreign Application Priority Data
Jul. 29, 2010 (ES) .................... 201030814

(51) Int. Cl.
 *B66C 1/42* (2006.01)
 *B66C 1/62* (2006.01)
(52) U.S. Cl.
 USPC .............. 294/110.1; 294/67.1; 294/67.31; 29/889
(58) Field of Classification Search
 USPC ............... 294/110.1, 110.2, 118, 119, 119.2, 294/67.1, 67.31, 67.4, 67.41, 74, 902; 29/889, 889.1
See application file for complete search history.

(56) References Cited

U.S. PATENT DOCUMENTS

| | | | | |
|---|---|---|---|---|
| 1,216,291 A * | 2/1917 | Diescher | .................... | 294/67.31 |
| 1,472,325 A * | 10/1923 | Clayden | ........................ | 294/119 |
| 3,115,361 A * | 12/1963 | Miles | ............................. | 294/112 |
| 5,666,758 A * | 9/1997 | Vaillier et al. | ................. | 43/17.2 |
| 5,772,269 A * | 6/1998 | Henning et al. | ........... | 294/67.22 |
| 7,207,777 B2 | 4/2007 | Bervang | | |
| 8,317,455 B2 * | 11/2012 | Mizelmoe | ..................... | 414/814 |
| 2008/0307647 A1 | 12/2008 | Kessler | | |
| 2009/0025219 A1 * | 1/2009 | Hansen et al. | .................. | 29/889 |

(Continued)

FOREIGN PATENT DOCUMENTS

| | | |
|---|---|---|
| EP | 1507975 | 2/2005 |
| WO | WO 03/100249 | 12/2003 |
| WO | WO 2009/112887 | 9/2009 |

*Primary Examiner* — Dean Kramer
(74) *Attorney, Agent, or Firm* — Ostrolenk Faber LLP (57) ABSTRACT

A tool to enable removal of a wind turbine blade, wherein the weight of the blade itself secures the blade without need for additional fixation. The tool includes an articulated structure, composed of an upper part and a lower part articulated to each other; a cradle-shaped support attached to the lower part of the structure and configured to house a blade, the cradle-shaped support having two portions being moveable to each other; a hooking element which allows the tool to be suspended from a first crane; and springs fixed to the structure for exerting an aperture force on the structure, which allows automatic aperture of the structure in the absence of blades in the interior of the cradle.

19 Claims, 5 Drawing Sheets

(56) References Cited

U.S. PATENT DOCUMENTS

| | | |
|---|---|---|
| 2010/0018055 A1 | 1/2010 | Lynderup et al. |
| 2011/0008147 A1* | 1/2011 | Lemos et al. .................. 414/800 |
| 2011/0185571 A1* | 8/2011 | Maj et al. ........................ 29/889 |
| 2012/0098283 A1* | 4/2012 | Maj et al. ..................... 294/67.1 |

* cited by examiner

TOOL FOR RAISING AND LOWERING A WIND TURBINE BLADE

FIELD OF THE INVENTION

The present invention is in the technical field of wind turbine power generation, and more particularly the invention relates to a tool for raising and lowering a wind turbine blade which allows mounting, removal and modification of the position of a wind turbine blade with minimum need for labour.

BACKGROUND OF THE INVENTION

During assembly and handling of wind turbine blades, different tools are used to help mounting the blade in the correct position, without said blade suffering damage during raising thereof.

An example of said tools is disclosed in European patent EP1507975 (Vestas), which allows mounting of the blade in an upright position, which is very useful in small spaces.

Additionally, United States patent application US2008307647 (Siemens) discloses a device for mounting blades which comprises a telescopic and movable arm.

On the other hand, United States patent application US2010018055 (Siemens) discloses a device equipped with an arm for securing the blade while said blade is oriented using a cable.

Finally, international application WO2009112887 (Tecsis) relates to a versatile manner of handling the blades wherein the forces generated are balanced.

The technical problem posed consists of describing a tool for raising a wind turbine blade wherein an operator does not need to handle an element in order to apply a closing force between the device and the blade.

DESCRIPTION OF THE INVENTION

The technical problem described is solved by means of a tool for raising and lowering a wind turbine blade which allows application of a closing force between the blade and said tool, leveraging the weight of the blade.

The tool for raising the blade according to the invention is designed to remove a wind turbine blade from the hub of said wind turbine. As the case may be, the tool may be used to handle an incorrectly disposed blade at height and to raise the blade so as to help mounting said blade onto the hub of the wind turbine.

The tool for raising and lowering a wind turbine blade according to the invention comprises an articulated structure composed of an upper part and a lower part articulated to each other.

According to a preferred embodiment of the invention, the structure is a double structure which in turn comprises two parallel quadrangular substructures, each of which is composed of two upper arms disposed on the upper part and articulated to each other by their first ends by means of corresponding upper articulations, and two lower arms disposed on the lower part and also articulated to each other by their first ends by means of corresponding lower articulations, wherein the second end of each upper arm is articulated in relation to the corresponding second end of a lower arm by means of corresponding lateral articulations.

According to a preferred embodiment, the articulations comprise a cylinder-shaped shaft body, whereto the corresponding ends of the homologous arms of each structure are joined; likewise, the articulations additionally comprise fixing means to secure the arms in the adequate position.

According to a preferred embodiment, the arms are substantially flat elements and the fixing means comprise spacing washers and retention washers, said washers being disposed in the corresponding shaft body to guarantee the stable positioning of the arms along parallel planes on the shaft bodies, in such a manner as to avoid unnecessary and inconvenient bending stresses in the arms.

The retention washers may cooperate with corresponding fixing nuts, even though the fixing washers are preferably welded to the corresponding shaft bodies, avoiding the maintenance associated to the joints between the fixing washers and the fixing nuts.

The invention further comprises a cradle-shaped support attached to the lower part of the structure and configured to house a wind turbine blade. Said cradle-shaped support comprises two portions being movable with respect to each other.

Preferably, the cradle-shaped support is housed in the lower arms, with each of said portions fixed to a homologous lower arm of each substructure. The portions are configured in such a manner as to adapt to the outer shape of the blade tip. Preferably, the portions are manufactured from sufficiently elastic materials to allow housing of the tips of different-sized blades. Optionally and/or alternatively, the cradle-shaped support may be substituted for another of different dimensions, in order to adapt to blades of different dimensions. The tool comprises a hooking element to allow suspension of the tool of the invention from a first crane. Preferably, the hooking element is disposed in the upper articulation.

A wind turbine blade having a root at one end and a tip at the other end is initially mounted onto the hub of said wind turbine in a substantially horizontal position, fixed to said hub by the root and having its tip free. It is proceeded to secure the blade by holding said blade by a section near the tip using the tool according to the invention, which is suspended from the first crane by means of the hooking element, as well as holding the root using a sling or similar suspended from a second crane. Next, bolts that join the root of the blade to the hub of the wind turbine are released and the cranes are coordinated to carry out the blade-lowering movement.

The portion of blade weight that rests upon the cradle-shaped support tends to articulate the arms closing the structure, in such a manner that the cradle presses against the blade, ensuring fixation of said blade.

Advantageously, the invention additionally includes springs fixed to the upper part and to the lower part of the structure in order to exert an aperture force on said structure. The elastic characteristic of the elastic elements is such as to allow a force sufficiently light so as not to negatively affect the fixation of the blade in the cradle-shaped support and sufficiently strong as to cause the automatic aperture of the structure, allowing removal of the blade once lowered. Preferably, the springs are fixed to the structure connecting the upper arms and the lower arms.

DESCRIPTION OF THE DRAWINGS

To complete the description being made and with the object of helping to better understand the characteristics of the invention, according to a preferred example of practical embodiment thereof, a set of drawings have been included as an integral part of said description wherein the following has been represented in an illustrative and non-limiting manner.

PREFERRED EMBODIMENT OF THE INVENTION

Two preferred embodiments of the invention are described below, with the help of FIGS. 1, 2, 3a, 3b, 4a, 4b, 5a and 5b.

First Embodiment

Figure 1:
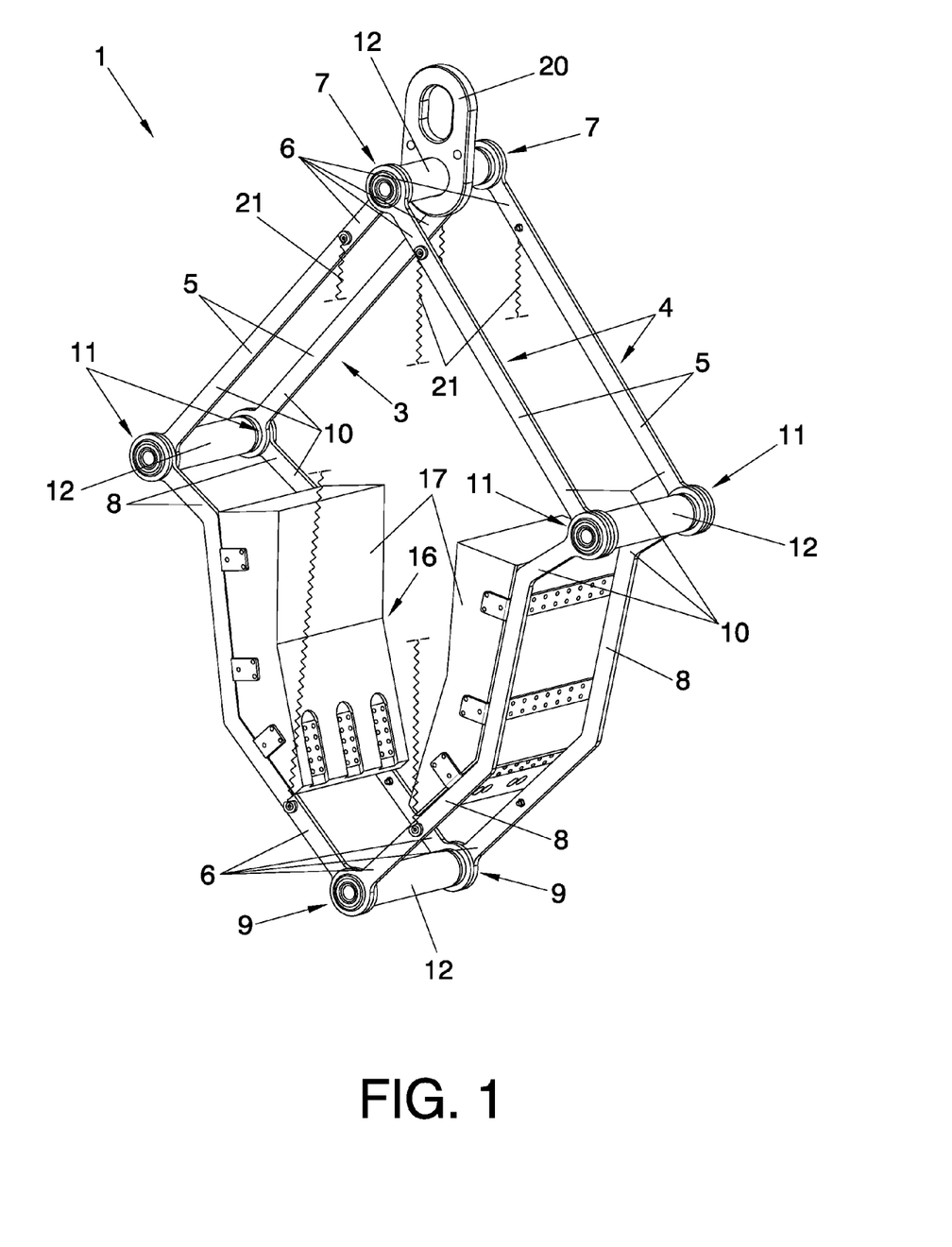
FIG. 1 Shows a perspective view of the blade-raising tool according to the invention.

FIG. 1 shows a tool (1) for raising and lowering a wind turbine blade (2) (see FIG. 2) according to the present invention, said tool (1) being designed to remove one of the blades (2) of a wind turbine from the hub of said wind turbine.

The tool (1) comprises an articulated, double, quadrangular structure (3) composed of two parallel quadrangular substructures (4), each substructure (4) being formed by two substantially flat upper arms (5) disposed on the upper part of the substructures (4), and of two substantially flat lower arms (8) disposed on the lower part of the substructures (4). The arms (5, 8) comprise a first end (6) and a second end (10). The upper arms (5) of each substructure (4) are articulated to each other by their first ends (6) by means of corresponding upper articulations (7); likewise, the lower arms (8) are articulated to each other by their first ends (6) by means of corresponding lower articulations (9), wherein the second end (10) of each upper arm (5) is articulated with the corresponding second end (10) of a lower arm (8) by means of corresponding lateral articulations (11).

The articulations (7, 9, 11) comprise a cylinder-shaped shaft body (12) whereto the corresponding ends (6, 10) of the homologous arms (5, 8) of each structure are joined and the articulations (7, 9, 11) additionally comprise fixing means for maintaining the arms (5, 8) in an adequate position, said fixing means being materialised in the form of spacing washers and retention washers, said washers being disposed on the corresponding shaft body (12) to guarantee a stable layout of the arms (5, 8) along parallel planes on the shaft bodies (12), in such a manner as to avoid unnecessary and inconvenient bending stresses in the arms (5, 8). The retention washers are welded to the corresponding axle bodies (12).

The lower arms (8) are configured to house a cradle-shaped support (16) which, in turn, is configured to house the tip (18) of a wind turbine blade (2). The cradle-shaped support (16) comprises two portions (17), each of said portions (17) being fixed to a lower homologous arm (8) of each substructure (4). The portions (17) are configured in such a manner as to adapt to the external shape of the tip (18) of the blade (2). The portions (17) are manufactured from sufficiently elastic materials to allow housing of blade (2) tips (18) of different dimensions.

Figure 2:
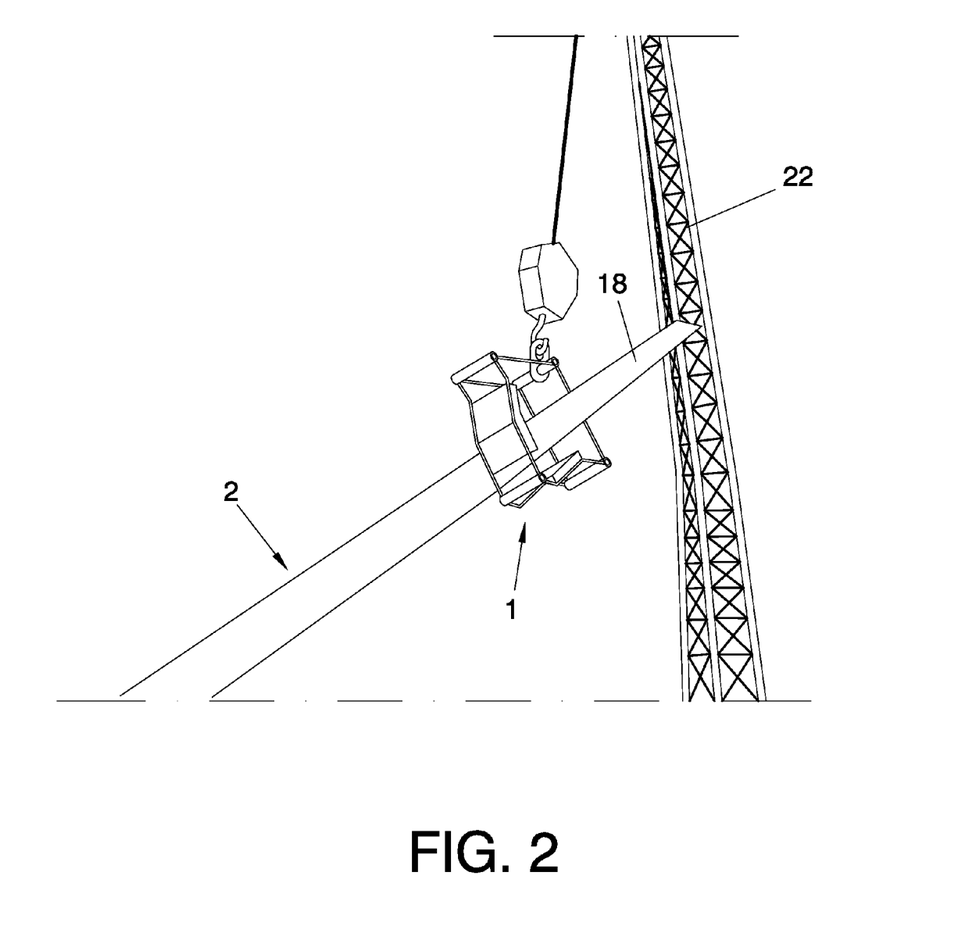
FIG. 2 Shows a perspective view of the invention in operation.

A hooking element (20) is disposed on the upper articulation (7) to allow the tool (1) of the invention to be suspended from a first crane (22).

The portion of the blade (2) weight that rests upon the cradle-shaped support (16) tends to articulate the arms (5, 8), closing the structure (3), in such a manner that the cradle-shaped support (16) presses against the blade (2), ensuring fixation of said blade (2).

The invention additionally includes tension springs (21) fixed to the upper arms (5) and to the lower arms (8), for exerting an aperture force on the structure (3), which allows the automatic aperture of said structure (3) when the blade (2) has been lowered, without negatively affecting the fixation of the blade (2) in the cradle-shaped support (16).

Second Embodiment

In the second embodiment the cradle-shaped support (16) further comprises slings (23), which are flexible strips that join the portions (17) to each other by the lower part of said portions (17). Said slings (23) fulfil at least two functions:

When the weight of the blade (2) tip (18) rests upon said slings (23), the slings (23) exert a force that tends to approximate the portions (17) of the cradle-shaped support (16) to each other and to the blade (2), allowing articulation of the arms (5, 8) of the structure (3);

The slings (23) provide a flexible support for the blade (2), preventing interference of the blade (2) with edges and other elements of the tool (1) that could damage the surface of the blade (2).

Additionally, preferably, the force exerted by the slings (23) on the portions (17) of the cradle-shaped support (16) allows limitation of the aperture of the structure (3) to a certain maximum value which is sufficient to insert the blade (2) into the tool (1) prior to raising said blade (2).

Preferably, the length of the slings (23) is shorter than twice the distance between the lower edge of each portion (17) of the cradle-shaped support (16) and the corresponding first end (6) of the lower arm (8).

Figure 3A:
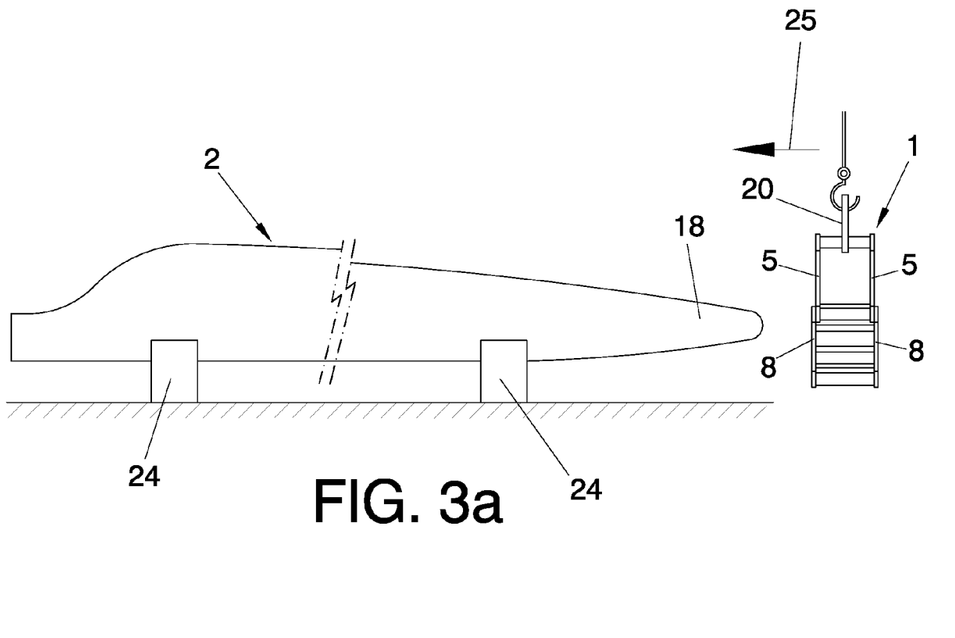
FIGS. 3a and 3b show a side view (3a) and front view (3b) of the blade and tool of the invention prior to introducing the blade in the tool.
Figure 3B:
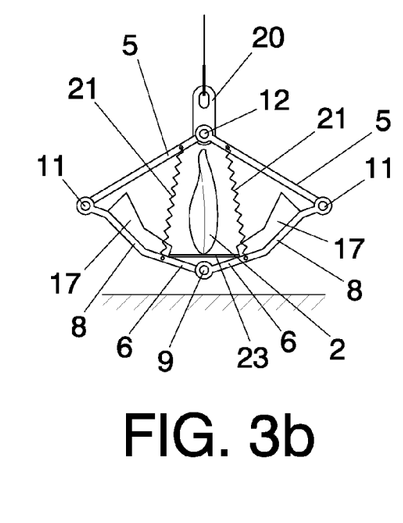

The operation of the raising tool (1) which incorporates the flexible slings (23) according to the invention is shown below in FIGS. 3a, 3b, 4a, 4b, 5a and 5b:

FIGS. 3a and 3b show a blade (2) that rests upon two supports (24). The tool (1) additionally incorporates slings (23) and is opened due to the aperture force of the springs (21). The aperture of the tool (1) is limited by the length of the slings (23).

Figure 4A:
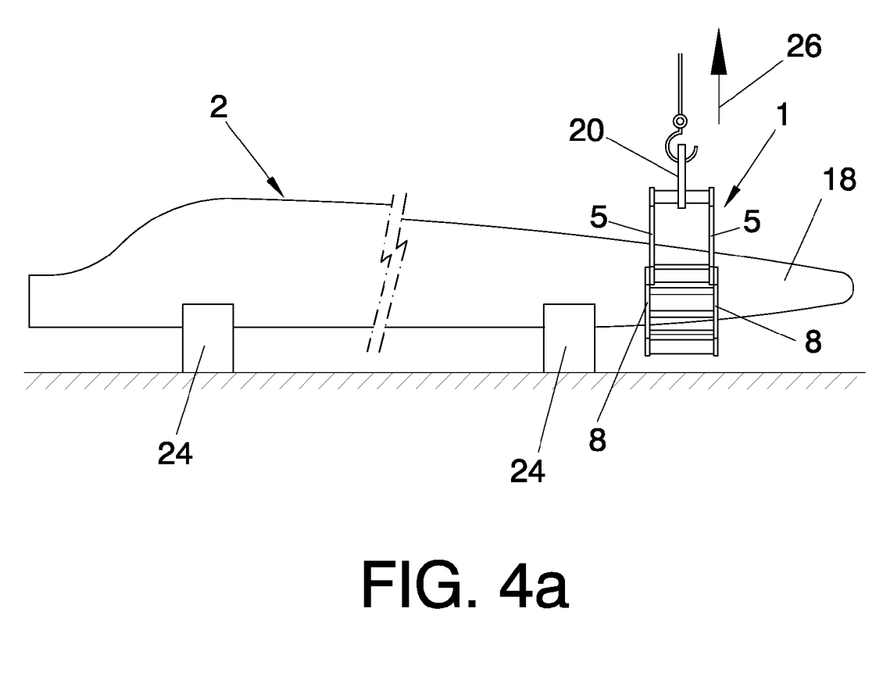
FIGS. 4a and 4b show a side view (4a) and a front view (4b) of the blade introduced into the tool prior to raising the blade.
Figure 4B:
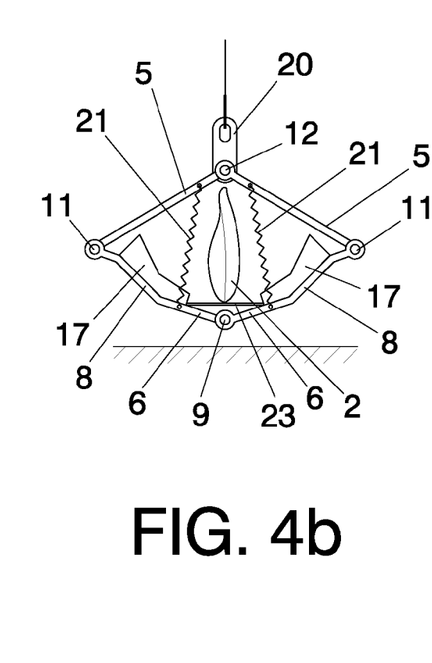

FIGS. 4a and 4b illustrate the blade (2) introduced in the tool (1) by moving the tool (1) towards the blade (2) in the direction indicated by the arrow (25) of FIG. 3a. The aperture of the tool (1) allows the operation to be carried out without interferences between the tool (1) and the blade (2).

Figure 5A:
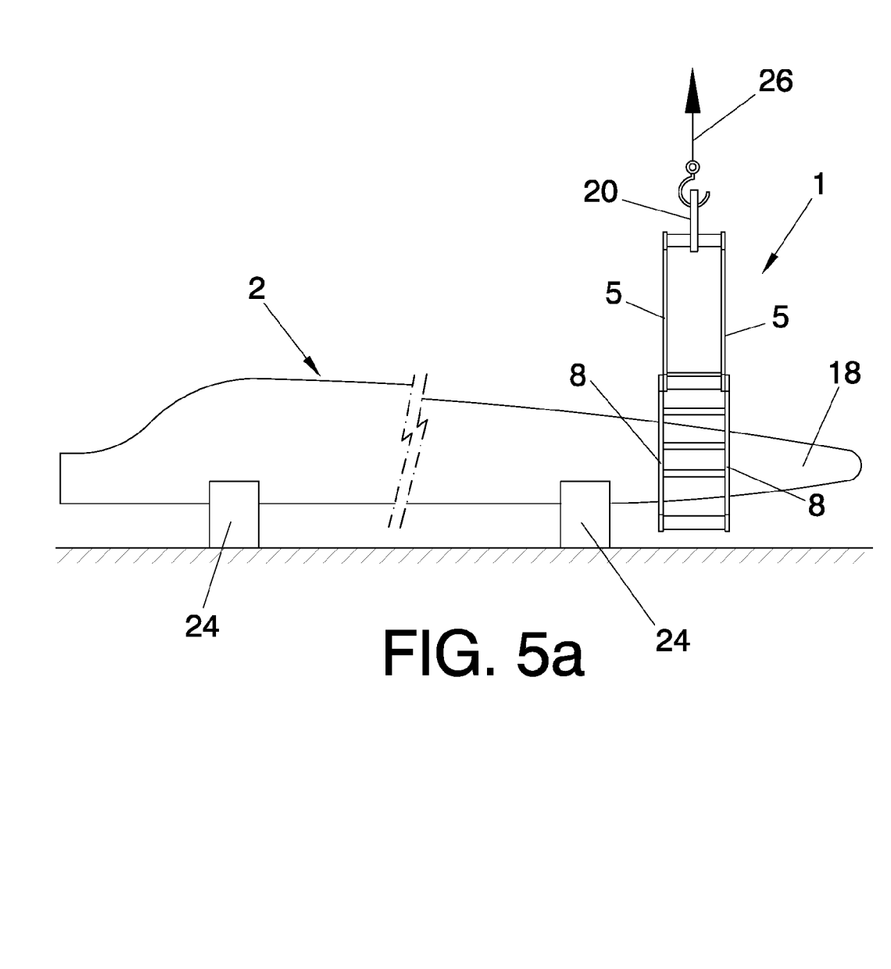
FIGS. 5a and 5b show a side view (5a) and a front view (5b) of the blade introduced into the tool while raising the blade.
Figure 5B:
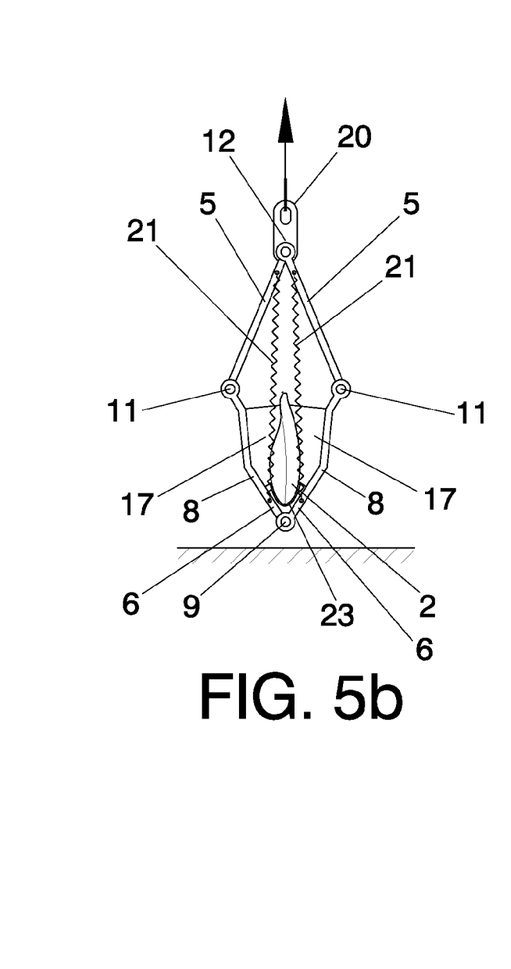

FIGS. 5a and 5b show that, by vertically moving the hooking element (20) of the tool (1) in the direction of the arrow (26) of FIGS. 4a and 5a, by means of the first crane (22), for example, the slings (23) come into contact with the blade (2). When said contact takes place, the effect of the weight of the blade (2) that rests upon the slings (23) causes articulation of the arms (5, 8) of the structure (3) and the approximation of the portions (17) of the cradle-shaped support (16) until embracing the blade (2).

The slings (23) prevent the surface of the blade (2) from becoming damaged due to interference with edges or other elements of the tool (1) throughout the entire blade (2) handling process, including both raising and lowering movements.

The invention claimed is:

1. A tool for raising and lowering a wind turbine blade, the tool comprising:
   a structure having an upper part and a lower part articulated to each other, wherein the upper and lower part of the structure define a closed contour;
   a hooking element configured so as to allow the tool to be suspended from a first crane; and a cradle-shaped support attached to the lower part of the structure for housing the blade, said cradle-shaped support comprising two portions, wherein the upper part and the lower part of the structure are articulated with respect to each other so as to move between an open position configured to receive the blade inserted in the closed contour defined by the upper and the lower part of the structure, and a closed position in which the two portions of the cradle-shaped support are in contact with the blade;

the tool further comprising springs, fixed to the structure, and having a stiffness which is so high as to allow the springs to exert an opening force on the structure so as to maintain the structure in the open position in the absence of a blade within the structure, wherein the stiffness of the springs is so low as to allow the structure to reach the closed position by the combination of the effects of at least part of a weight of the blade and a vertical upward force applied to the hooking element.

2. The tool for raising and lowering the wind turbine blade of claim 1, wherein the structure comprises two parallel quadrangular substructures, each substructure comprising two upper arms disposed on the upper part of the substructures, and comprising two lower arms disposed on the lower part of the substructures, wherein the arms comprise a first end and a second end, wherein the upper arms of each substructure are articulated to each other by their first ends by means of corresponding upper articulations, and the lower arms are articulated to each other by their first ends by means of corresponding lower articulations, wherein the second end of each upper arm is articulated with the corresponding second end of a lower arm by means of corresponding lateral articulations.

3. The tool for raising and lowering the wind turbine blade of claim 2, wherein the articulations comprise:

a cylinder-shaped shaft body whereto the ends corresponding to the homologous arms of each substructure are joined; and affixers configured to secure the arms in position.

4. The tool for raising and lowering the wind turbine blade of claim 3, wherein the arms are substantially flat and the affixers comprise spacing washers and retention washers, said washers being disposed on the corresponding shaft body to guarantee a stable layout of the arms along parallel planes on the shaft bodies.

5. The tool for raising and lowering the wind turbine blade of claim 4, wherein the retention washers are welded to the corresponding shaft bodies.

6. The tool for raising and lowering the wind turbine blade of claim 2, wherein the arms are substantially flat.

7. The tool for raising and lowering the wind turbine blade of claim 2, wherein the cradle-shaped support is housed in the lower arms, and each of the portions is fixed to a lower homologous arm of each substructure, wherein the portions are configured to adapt to the outer shape of the tip of the blade when the weight of the blade causes articulation of the arms, closing the structure.

8. The tool for raising and lowering the wind turbine blade of claim 7, wherein the portions are manufactured using sufficiently elastic materials to allow housing of tips of blades of different dimensions.

9. The tool for raising and lowering the wind turbine blade of claim 2, wherein the hooking element is disposed on the upper articulation.

10. The tool for raising and lowering the wind turbine blade of claim 2, wherein the springs are disposed connecting the upper arms and lower arms.

11. The tool for raising and lowering the wind turbine blade of claim 2, additionally comprising:

at least one sling by way of a flexible strip for joining the portions to each other by the lower part of the portions, said at least one sling being adapted to exert a force that tends to approximate the portions to each other and to the blade, allowing articulation of the arms of the structure, when the weight of the blade tip rests upon said at least one sling.

12. The tool for raising and lowering the wind turbine blade of claim 11, wherein the length of the at least one sling is shorter than twice a distance between a lower edge of each portion of the cradle-shaped support and the first end of a corresponding lower arm.

13. The tool for raising and lowering the wind turbine blade of claim 1, wherein the portions are manufactured using sufficiently elastic materials to allow housing of tips of blades of different dimensions.

14. The tool for raising and lowering the wind turbine blade of claim 1, wherein the springs are fixed to the upper part and to the lower part of the structure.

15. The tool for raising and lowering the wind turbine blade of claim 1, wherein the cradle-shaped support is detachable.

16. A tool for raising and lowering a wind turbine blade, the tool comprising:

a structure having an upper part and a lower part articulated to each other, wherein the upper and lower part of the structure define a closed contour;

a hooking element configured so as to allow the tool to be suspended from a first crane; and a cradle-shaped support attached to the lower part of the structure for housing the blade, said cradle-shaped support comprising two portions, wherein the upper part and the lower part of the structure are articulated with respect to each other between an open position configured to receive the blade inserted in the structure, and a closed position in which the two portions of the cradle-shaped support are in contact with the blade;

springs fixed to the structure, and the springs having a stiffness to exert an opening force on the structure so as to maintain the structure in the open position in the absence of blades within the structure, wherein the structure comprises two parallel quadrangular substructures, each substructure comprising two upper arms positioned on the upper part of the substructures, and comprising two lower arms positioned on the lower part of the substructures, wherein the arms comprise a first end and a second end, wherein the upper arms of each substructure are articulated to each other by their first ends by means of corresponding upper articulations, and the lower arms are articulated to each other by their first ends by means of corresponding lower articulations, wherein the second end of each upper arm is articulated with the corresponding second end of a lower arm by means of corresponding lateral articulations.

17. The tool for raising and lowering the wind turbine blade of claim 16, wherein the articulations comprise:

a cylinder-shaped shaft body joining ends corresponding to the homologous arms of each substructure; and affixers configured to secure the arms.

18. The tool for raising and lowering the wind turbine blade of claim 17, wherein the arms are flat and the affixers comprise spacing washers and retention washers, said washers being positioned on the corresponding shaft body and providing a stable layout of the arms along parallel planes on the shaft bodies.

19. The tool for raising and lowering the wind turbine blade of claim 16, wherein the arms are flat.

* * * * *